(12) United States Patent
Amador

(10) Patent No.: US 7,239,751 B1
(45) Date of Patent: Jul. 3, 2007

(54) HYPOTHESIS SUPPORT MECHANISM FOR MID-LEVEL VISUAL PATTERN RECOGNITION

(75) Inventor: Jose J Amador, Cocoa, FL (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 788 days.

(21) Appl. No.: 10/750,629

(22) Filed: Dec. 18, 2003

(51) Int. Cl.
*G06K 9/48* (2006.01)
(52) U.S. Cl. ..................................................... 382/197
(58) Field of Classification Search ................ 382/164, 382/165, 170, 171, 173, 181, 190–201, 281; 704/231, 236–245; 706/20; 714/39; 725/19
See application file for complete search history.

(56) References Cited

U.S. PATENT DOCUMENTS

| | | | |
|---|---|---|---|
| 3,069,654 | A | 12/1962 | Hough |
| 5,828,769 | A | 10/1998 | Burns |
| 6,009,198 | A | 12/1999 | Syeda-Mahmood |
| 6,026,189 | A | 2/2000 | Greenspan |
| 6,173,066 | B1 | 1/2001 | Peurach |
| 6,252,986 | B1 | 6/2001 | Chang |
| 6,324,299 | B1 | 11/2001 | Sarachik et al. |
| 2002/0057838 | A1 | 5/2002 | Steger |

OTHER PUBLICATIONS

Iso, Jiang et al., "A fast approach to the detection and correction of skew documents," Pattern Recognition Letters, Vol. 18, pp. 675-686 (1997).
Avanindra et al., "Robust detection of skew in documented images," IEEE Trans. Image Processing, vol. 6, pp. 344-349, Feb. 1997.
Wallack and Maocha, Robust Algorithms for Object Localizaiton. International Journal of Computer Vision, 27(3):243-262, 1998.
Akio Kimura and Takashi Watanabe., "An Extension of the Generalized Hough Transform to Realize Affine-Invariant Two-dimensional(2D) Shape Detection" IEEE 2002.
Kimura, Akio, "Generalized Hough Transform to be Extended as an Affine-invariant Detector of Arbitary Shapes," IEICE, vol. J84-D-II, No. 5 2001. (in Japanese).
Kimura, Akio, "Fast Generalized Hough Transform that Improves its Robustness of Shape Detection," IEICE, vol. J83-D-II, No. 5, 2000. (in Japanese).

*Primary Examiner*—Matthew C. Bella
*Assistant Examiner*—G. F. Cunningham
(74) *Attorney, Agent, or Firm*—Randall M. Heald; Stephen J. Stark

(57) ABSTRACT

A method of mid-level pattern recognition provides for a pose invariant Hough Transform by parametrizing pairs of points in a pattern with respect to at least two reference points, thereby providing a parameter table that is scale- or rotation-invariant. A corresponding inverse transform may be applied to test hypothesized matches in an image and a distance transform utilized to quantify the level of match.

18 Claims, 10 Drawing Sheets

HYPOTHESIS SUPPORT MECHANISM FOR MID-LEVEL VISUAL PATTERN RECOGNITION

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

The present invention relates to computer vision systems, and more particularly to the application of a novel version of the Generalized Hough Transform to reduce the computational complexity of matching an object depicted in an image.

BACKGROUND OF THE INVENTION

The ultimate goal of computer vision is image understanding, in other words, knowing what is within an image at every coordinate. A complete computer vision system should be able to segment an image into homogeneous portions, extract regions from the segments that are single objects, and finally output a response as to the locations of these objects and what they are.

Frameworks for image understanding consists of three, not necessarily, separate processes. Consider a representative computer vision system as shown in FIG. 1A. In the first process 11, image segmentation is performed, this consists of dividing the image into homogeneous portions that are similar based on a correlation criterion. Much of the work in computer vision has focused in this area with topics including edge detection, region growing (clustering), and thresholding as the primary methods. Image segmentation is referred to as the low-level vision (LLV) process. In the second process 12, region extraction is performed. Region extraction receives as input, the results obtained during the LLV stage. With this information region extraction, or the intermediate-level vision (ILV) process, attempts to represent the segments as single, hypothesized objects. This requires the ILV process to search for evidence on the desired region using the LLV process' output. Consequently, the third process 13 performs image understanding based on the extracted regions provided as input. The hypothesized-image understanding operation is referenced as the high-level vision (HLV) process.

Most computer vision research over the past 30 years has focused on LLV processes. Efforts to further the knowledge of ILV processes have primarily utilized LLV methods. Therefore, it remains an objective of computer vision systems to locate low-level image regions whose features best support alternative image hypotheses, developed by a high-level vision process, and provide the levels- and indicators-of-match.

There have been many attempts to solve the ILV problem utilizing a Hough Transform methodology. The Hough Transform is a particularly desirable technique for use in vision systems when the patterns in the image are sparsely digitized, for instance having gaps in the patterns or containing extraneous "noise." Such gaps and noise are common in the data provided by LLV processes such as edge detection utilized on digitally captured images. The Hough Transform was originally described in U.S. Pat. No. 3,069,654.

In an influential paper by D. H. Ballard the Hough Transform was generalized for arbitrary shapes, the technique was coined Generalized Hough Transform (GHT), *Generalizing the Hough Transform to Detect Arbitrary Shapes* (1981). The generalized Hough Transform is a method for locating instances of a known pattern in an image. The search pattern is parameterized as a set of vectors from feature points in the pattern to a fixed reference point. This set of vectors is the R-table. The feature points are usually edge features and the reference point is often at or near the centroid of the search pattern. The, typically Cartesian, image space is mapped into parameter or Hough space. To locate the pattern in an image, the set of feature points in the image is considered. Each image feature is considered to be each of the pattern features in turn and the corresponding locations of the reference point are calculated. An accumulator array keeps track of the frequency with which each possible reference point location is encountered. After all the image features have been processed the accumulator array will contain high values (peaks) for locations where many image features coincided with many pattern features. High peaks (relative to the number of features in the pattern) correspond to reference point locations where instances of the pattern occur in the image. The Hough Transform can be enhanced by considering rotated and shortened or lengthened versions of the vectors to locate instances of the pattern at different orientations and scales. In this case, a four dimensional accumulator array is required and the computation is increased by two orders of magnitude. The key contribution of the GHT is the use of gradient vector data to reduce the computation complexity of detecting arbitrary shapes. Unfortunately, the method's time and space complexity becomes very high by requiring the entire search of a four-dimensional Hough parameter space. For rotation- and scale-invariance, the GHT method requires a priori knowledge of the possible rotations and scales that may be encountered. More recent procedures that provide either or both of rotation and scale invariance using the Hough Transform include:

The work of Jeng and Tsai, *Fast Generalized Hough Transform* (1990), which proposes a new approach to the GHT where transformations are applied to the template in order to obtain rotation- and scale-invariance. The R-Table is defined as in the original GHT technique. Scale-invariance is provided by incrementing all the array positions of a Hough parameter space using another table called the SI-PSF. For rotation-invariance each position in the SI-PSF with a non-zero value generates a circle with its center at the reference point; a radius equal to the distance between the reference point and this position of the SI-PSF is calculated. Subsequently, these circles are correspondingly superimposed onto each image point in order. Obviously, each image point requires a high number of increments; the computational complexity of this method is very high if the template and the image shapes have a large number of points.

The disclosure of Thomas followed trying to compress the Hough parameter space by one degree of freedom to obtain the location of arbitrary shapes at any rotation, *Compressing the Parameter Space of the Generalized Hough Transform* (1992). This method considers a set of displacement vectors, {r}, such that each edge pixel with identical gradient angles increments positions in one plane of the parameter space. Thus, the original four-dimensional Hough parameter space of the GHT reduces to 3-dimensions. As a result, the technique is not scale-invariant and requires the same processing complexity as performed in the GHT.

Pao, et al., *Shape Recognition Using the Straight Line Hough Transform* (1992), described a technique derived from the straight-line Hough Transform. A displacement invariant signature, called the STIRS, is obtained by subtracting points in the same column of the STIRS space. Subsequently, template and image signatures are compared using a correlation operator to find rotations. Unfortunately, scale-invariance is not provided for since it must be known a priori. Experiments show that the STIRS does not work well when different shapes appear in the image.

A new version to the GHT called the Linear GHT (LIGHT) was developed by Yao and Tong, *Linear Generalized Hough Transform and its Parallelization* (1993). A linear numeric pattern was devised, denoted the vertical pattern, which constitutes the length of the object along the direction of a reference axis (usually the y-axis). The authors state that rotation- and scale-invariance is handled, using this new method, in much the same way it is performed by the GHT. Clearly, the same deficiencies exist for this method as it requires a large Hough parameter space and the a priori knowledge of the expected rotations and scales.

The effort of Ser and Sui, *A New Generalized Hough Transform for the Detection of Irregular Objects* (1995) describes an approach that merges the advantages of the Hough Transform and that of a technique called contour sequencing. The calculation of the contour sequence requires that an entire object's perimeter be available and not occluded. Thus, if a portion of the desired object is occluded, for instance—a noisy image, this method will fail.

Aguado, et al., *Arbitrary Shape Hough Transform by Invariant Geometric Features* (1997) approached the problem of region extraction by using the Hough Transform under general transformations. Even though this method provides for rotation- and scale-invariance, it comes at a complexity cost for derivations of shape-specific general transformations, also required for translation-invariance as well.

The most recent work by Guil, et. al. presents an algorithm based on the GHT which calculates the rotation, scale, and translation of an object with respect to a template, *A Fast Hough Transform for Segment Detection* (1995). The methodology consists of a three stage detection process and the creation of five new tables. Three of the tables are constructed for the template, the remaining two are used against the image. The first stage of the detection process obtains the rotation, the next gathers the scale, and finally the translation is found in the third The complexity of this method is clearly high as the image and template are repeatedly tested using different tables to obtain the invariant values. Furthermore, the results of a previous stage are used to obtain the answer to the next stage, hence, if a previous stage fails the next one will also. The use of gradient angles is appropriate, however, dividing the original R-Table into five tables to obtain the desired invariance's has added unnecessary complexity to the problem.

SUMMARY OF THE INVENTION

It is therefore an object of the invention to provide an ILV process utilizing a rotation-, scale- and translation-invariant Generalized Hough Transform, and furthermore to reduce the computational complexity inherent in the GHT.

It is another object of the invention to provide an ILV process that may be applied to different types of LLV results in computer vision applications.

It is yet another object of the invention to provide a transform inversion that may be used with the ILV process to verify proposed matches with a search pattern.

The technique of the invention is based on the GHT, and solves the problems of rotation- and scale-invariance that plaques the generalized Hough Transform while providing a technique that solves the ILV problem.

The Hough Transform is utilized in hypothesis testing. When testing the hypothesis of an object in an image, a considerable number of sub-hypotheses are generated in order to extract the correct region in the image. This makes the problem of region extraction one which is known as combinatorial optimization. Many combinatorial optimization techniques have been used to solve the region extraction problem, some are genetic algorithms, simulated annealing, and tabu search. None of these methods guarantee finding the correct or exact solution, only the best possible one (after a number of iterations of the given algorithm).

Unlike the methods listed above, the novel version of the generalized Hough Transform employed in the invention, called the *Pose-Invariant Hough Transform (PIHT)*, does not require the generation of numerous sub-hypotheses to locate the desired region for extraction. Instead, a new version of the R-Table, called the J-Table, is provided with rotation- and scale-invariance built-into the table (i.e., hypothesis). The novel PIHT method with its new J-Table is invariant to rotation or scale differences of the desired object in the image. This alleviates the need of generating sub-hypotheses and eliminates the complexities associated with it. Furthermore, the invention can use the results of the PIHT and perform the region extraction or indicator-of-match required by the ILV process. Hence, an entirely new technique is developed, called the *Inverse-Pose-Invariant Hough Transform (IPIHT)* which executes the indicator-of-match.

BRIEF DESCRIPTION OF THE DRAWINGS

The invention may be more fully understood from the following detailed description, in conjunction with the accompanying figures, wherein.

DETAILED DESCRIPTION OF THE INVENTION

Figure 2:
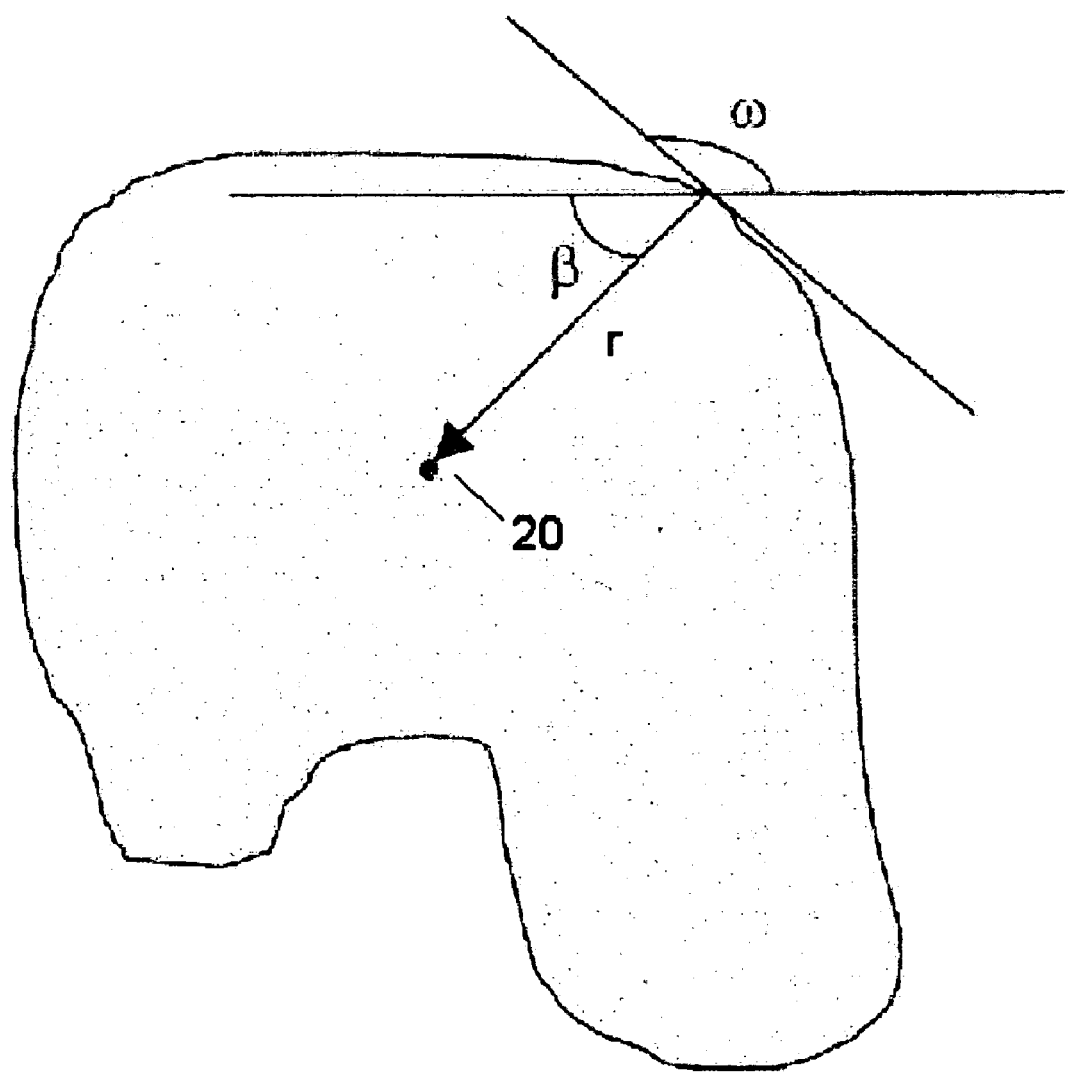
FIG. 2 is a diagram of the application of the GHT to create a hypothetical R-table for object.

The invention is addressed to the Intermediate Level Vision problem of detecting objects matched to a template or pattern. As shown in FIG. 2, the usual GHT defines the pattern by using an arbitrary point 20 preferably in a relatively central location, and measures the distance r and edge direction ω from that point. The edge direction is then characterized in the form of a reference point angle β and distance r, to construct a look-up table, or R-Table, giving for each edge direction, the distance/angle displacements from the reference point that can give rise to the template point. To apply the transform, the edge direction is measured at each LLV selected image point and accumulator cells indexed by the look-up table are incremented. The accumulated evidence in Hough parameter space is reflected as strong peaks indicating possible matches. Unfortunately, as parameters of rotation and scale are added, additional dimensions must be added to the accumulator space and computational issues are exponentially complicated.

In most cases the rotation and scale of an object is unknown. What is desired is a method which can overcome the limitations of the GHT while achieving an improved space complexity. To accomplish this, a variant to the GHT is disclosed that has the invariance "built-into" the R-Table. Hence, with a single template denoted as the hypothesis of the desired object, invariance is built-into the R-Table allowing the variant GHT technique to locate objects regardless of their rotation, scale, and translation in the image. The invariance to rotation, scale, and translation is defined as pose and the novel variant to the GHT is referred to as the *Pose-Invariant Hough Transform* (*PIHT*).

In the new approach, two-reference points are defined and two points from the pattern and image are used, instead of one. The use of pairs of points from the pattern aids in the parameterization of the arbitrary pattern shape and builds into the R-Table rotation- and scale-invariance. The two-reference point R-Table, with pose-invariance included and created from an object or pattern hypothesis, is denoted as the J-Table. Along with the new J-Table, a derivation of formulas using the two-image point concept (exploiting the J-Table's invariance) is provided which finds the desired pattern in the image.

Figure 1A:
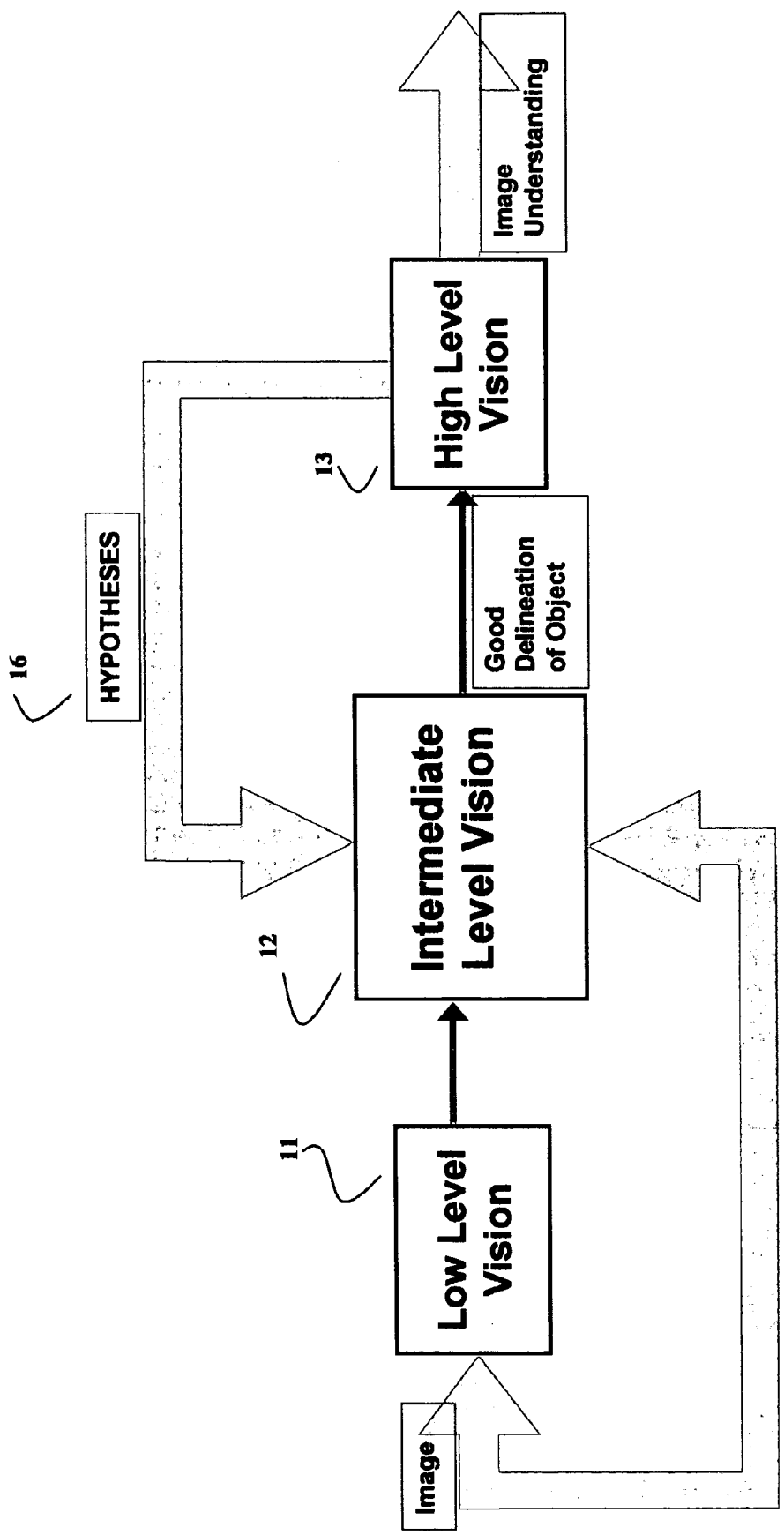
FIG. 1A is schematic chart of the position of the Intermediate Level Vision Recognition step in a computer vision system.
Figure 1B:
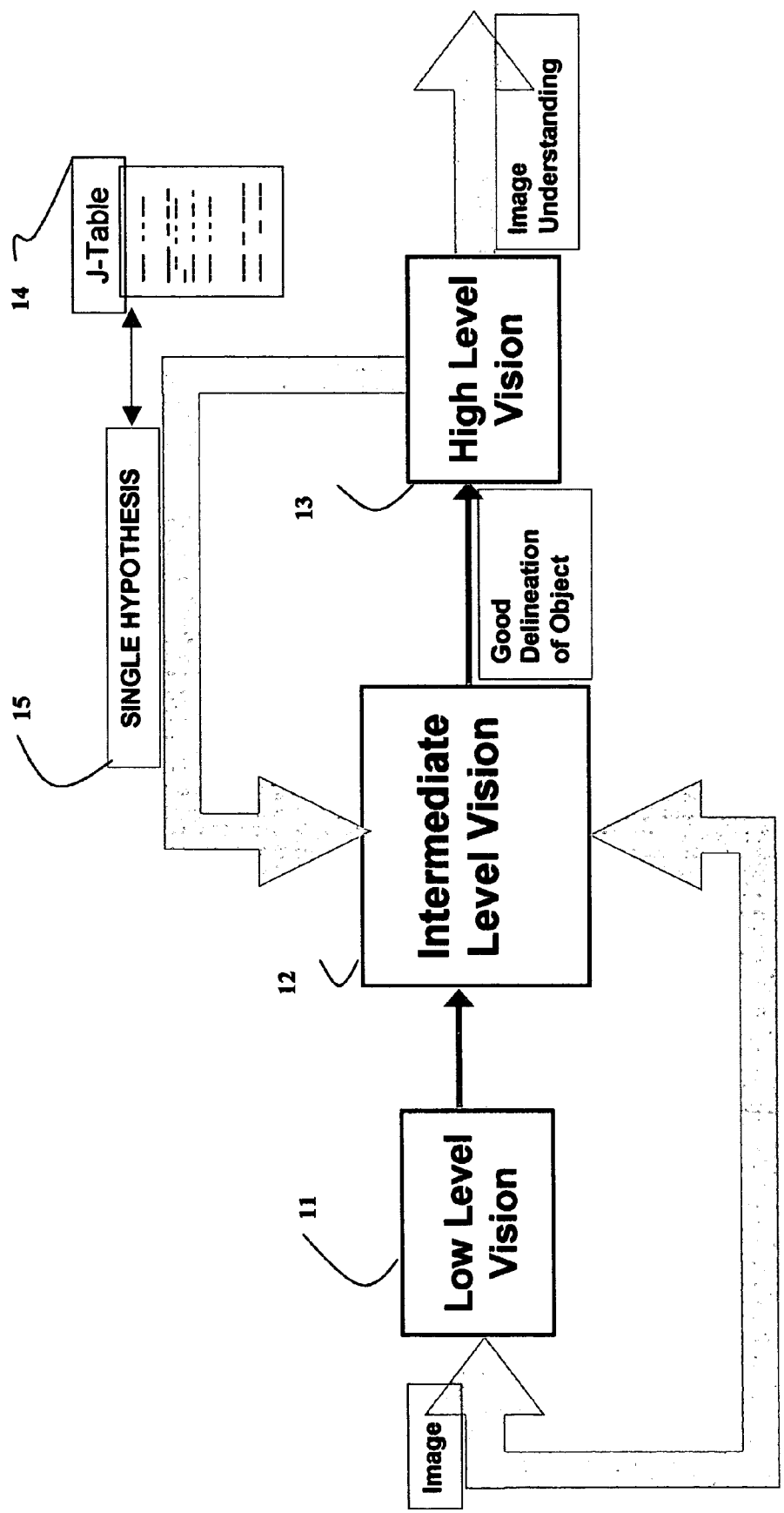
FIG. 1B is a schematic chart depicting application of the present invention to facilitate Intermediate Level Vision Recognition in a computer vision system.

Note that the J-Table provides a formalization of the HLV process. Consider that the R-Table used by the GHT is a type of hypothesis formalism for the HLV. R-Tables essentially provide hypotheses 16 that are tested against the image-data, as shown in FIG. 1A. Unfortunately, these hypotheses must be correct or exact, since the R-Table is created with fixed rotation and scale. On the other hand, the J-Table allows for not necessarily exact hypotheses, but still allows the desired object to be found using the PIHT algorithm as shown in FIG. 1B.

Figure 3:
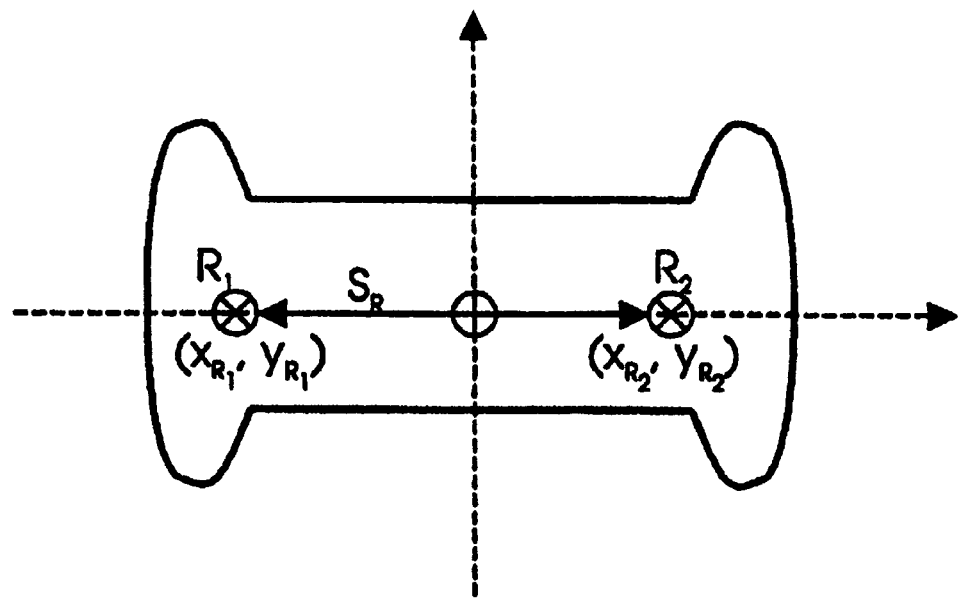
FIG. 3 is a diagram of the application of the Pose-Invariant Hough Transform utilizing two reference points.

Referring now to FIG. 3 as a diagrammatic example of the two-reference point concept, because of the two points ($R_1$ and $R_2$) instead of one, the distance, $S_R$, between reference points $R_1$ and $R_2$ can essentially describe the scale. Furthermore, the figure can define the rotation angle of the hypothesis, $\theta_R$. Thus, $$R_1 = (x_{R_1}, y_{R_1}); R_2 = (x_{R_2}, y_{R_2}).$$

Scale is equal to the distance between the two-reference points. This is easily calculated using the following distance formula, $$S_R = \sqrt{(x_{R_2} - x_{R_1})^2 + (y_{R_2} - y_{R_1})^2}. \tag{1}$$

Rotation is also calculated using the reference points. Recall from trigonometry that the tangent angle, θ, can simply be defined by taking the inverse or arc tangent's of both sides. The rotation formula, Equation 2, is achieved:

$$\theta_R = \tan^{-1}\left(\frac{y_{R_2} - y_{R_1}}{x_{R_2} - x_{R_1}}\right). \tag{2}$$

The standard settings for $S_R=1$ and $\theta_R=0°$ or $\theta_R=0$ radians (rads).

To provide the rotation- and scale-invariance desired, the two-image point concept mentioned earlier is used. The two-image point concept effectively means a collection of two-boundary point pairs on an object are used to store the pose-invariant information into the J-Table (hypothesis), as well as calculate pose data from the image which is compared to the contents of the J-Table (detection). If the arrangement of any two boundary points is used, there would be at most $$\binom{n}{2}$$

combinations of pose-invariant results which equates to a J-Table with as many rows. Since the basic methodology of the GHT is to examine each row of the table, the complexity for this method would be in the order of $O(2^n)$. In practice this is clearly inefficient, especially if n were very large. A more attractive method utilizes only a relevant (i.e., lesser) subset of points. This can be accomplished by considering gradient angles and still using the two-image point concept.

Figure 4:
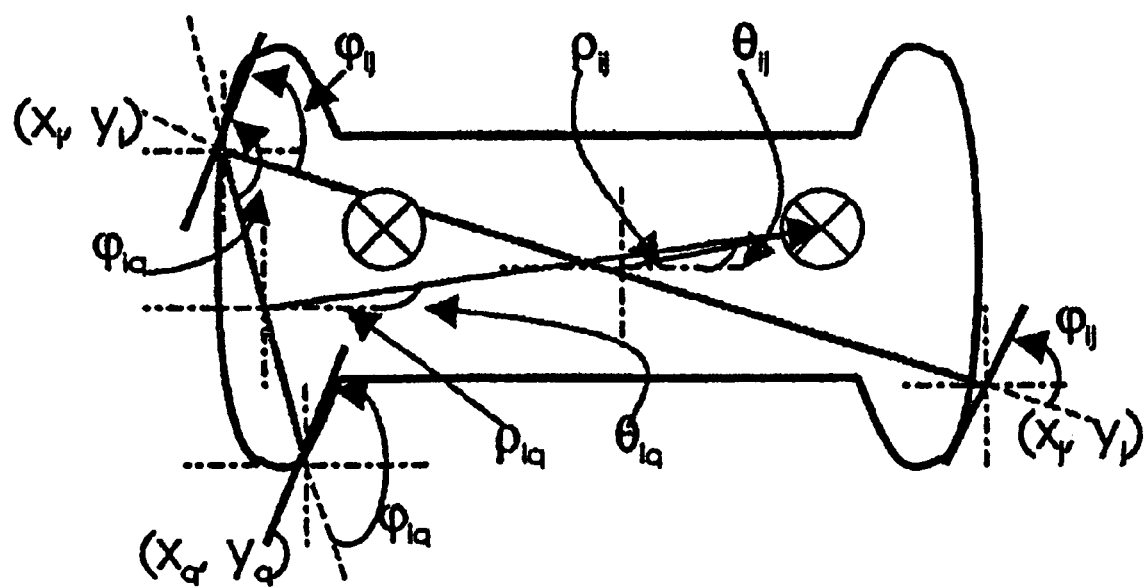
FIG. 4 is a diagram of matching pairs of gradient angles applied to the image of FIG. 3.

The underlying approach is to handle two-boundary points connected by a line that are parallel to each other in terms of their gradient angle. Refer to FIG. 4 containing an object of unknown rotation, unknown scale, and unknown translation. The rotation- and scale-invariant J-Table is defined by regarding this geometric model. The angle formed from the line connecting points i and j, σ the direction angle, to the gradient at either i or j provides the unique Parallel Gradient Identifier Angle, φ, or parallel angle for short. The parallel angle is used as the primary index value of the new J-Table, denoted $\phi_h$. The parallel angle, $\phi_h$, is calculated from the difference between the gradient angle, $\psi_h$, where $\psi_h = \psi_i = \psi_j$ and the direction angle, $\sigma_h$, for points i and j. Thus, $$\phi_h = \psi_h - \sigma_h \tag{3}$$

The parallel angle, as shown on FIG. 3, allows the unique identification of identical pairs of gradient angles, ψ, separated by different point distances, $S_h$, and having different direction angles, σ.

As shown on FIG. 4, points i and j have the same gradient angle, ψ, as points i and q. Even though these two pairs of points have matching gradient angles, they are clearly distinguished from each other by the use of the parallel angle methodology. It is obvious from the figure that the parallel angle for points i and j, $\phi_{ij}$, calculates to a value different than the parallel angle for points i and q, $\phi_{iq}$, such that $\phi_{ij} \neq \phi_{iq}$. Consequently, each of these pairs will map to a unique entry in the J-Table. Consider for a moment how the parallel angle, $\phi_h$, is obtained from the gradient angle, $\psi_h$, and the direction angle, $\sigma_h$.

With gradients of positive slope $\psi$ values are in the range $[0, \pi/2]$. When the direction angle, $\sigma$, is greater than $\pi/2$ but less than $\pi$, the $-\sigma$ angle is used in the calculation that is, $$-\sigma = \sigma - \pi.$$

Thus, in these situations $\phi = \psi - (-\sigma)$ or $\phi = \psi + \sigma$. On the other hand, with gradients of negative slope $\psi$ values are in the range $[\pi/2, \pi]$. When the direction angle, $\sigma$, is less than $\pi/2$ but greater than zero, $\sigma$ is used directly in Equation 3.

These observations of the gradient angle and the direction angle lead to the following additional remark for $\sigma$. The direction angle, $\sigma_h$, can be calculated by:

$$\sigma_h = \tan^{-1}\left(\frac{y_i - y_j}{x_i - x_j}\right). \tag{4}$$

Therefore, with these observations the parallel angle is obtained from the result of $\sigma_h$ given above (Equation 4) and simply using Equation 3. As a result, Equation 3 provides the new, unique index into the J-Table.

To impart scale-invariance, note that the distance between the two-parallel image points is $S_h$. Using the mid-point, $(x_m, y_m)$, between the two-parallel boundary points, $(x_i, y_i)$ and $(x_j, y_j)$, Equations 5 through 8 are used.

$$\rho_i = \sqrt{(ix_R - x_m)^2 + (y_R - y_m)^2} \tag{5}$$

$$\sigma_i = \tan^{-1}\left(\frac{y_R - y_m}{x_R - x_m}\right) \tag{6}$$

where, $$x_m = \frac{x_i + x_j}{2} \tag{7}$$

$$y_m = \frac{y_i + y_j}{2}. \tag{8}$$

Scale-invariance occurs after normalization of the radial distance, $\rho_i$, portion of the $P_i$ vector by point distance, $S_h$. This results in $P_S = [\rho_{S_R} \theta_i]$, where $\rho_{s_h}$ is defined as in Equation 9 and $S_h$ is defined as in Equation 10.

$$\rho_{s_h} = \frac{\rho_i}{S_h} \tag{9}$$

$$S_h = \sqrt{(x_i - x_j)^2 + (y_i - y_j)^2}. \tag{10}$$

Rotation-invariance is regarded when the parallel angle, $\phi_{ij}$, is calculated from a line passing between the two points i and j, to one of the gradient angles, $\psi_i$ or $\psi_j$, where $\psi_i = \psi_j$. Consequently, for all combinations of parallel gradient image points, i and j, with direction angle, $\phi_{ij}$, if the parallel angle of points i and j, $\phi_{ij}$, equals the parallel angle of the $h^{th}$ row of the J-Table, $\phi_h$, that is, $\phi_{ij} = \phi_h$, this indicates that the parallel gradient combination of i and j may belong to the $h^{th}$ combination of the J-Table. Hence, if the desired object is rotated by $\delta$, all gradient angles (parallel or otherwise) and radial vectors are also rotated by $\delta$ that is, $$\delta = \psi_i - \psi_h \tag{11}$$

With this information the new J-Table, denoted $J(\phi, \mathcal{L})$, is shown in Table 1.

TABLE 1

J-Table Concept

| PARALLEL ANGLE ($\phi_h$) | Set $\mathcal{L}_p$, |
|---|---|
| $\phi_0$ | $_{h_o}\{[\rho_s(\varphi 0), \theta_o(\varphi 0)]_o, S_h(\varphi 0), \sigma_o(\varphi 0); \ldots ;_{h_o} [\rho_s(\varphi 0), \theta_k(\varphi 0)]_k, S_h(\varphi 0), \sigma_k(\varphi 0)\}$ |
| $\phi_1$ | $_{h_o}\{[\rho_s(\varphi s), \theta_o(\varphi 1)]_o, S_h(\varphi s), \sigma_o(\varphi s); \ldots ;_{h_k} [\rho_s(\varphi s), \theta_s(\varphi_k)]_k, S_h(\varphi s), \sigma_k(\varphi 1)\}$ |
| ... | ... |
| $\phi_h$ | $_{h_o}\{[\rho_s(\varphi n), \theta_o(\varphi 0)]_o, S_n(\varphi n), \sigma_o(\varphi n); \ldots ;_{h_k} [\rho_s(\varphi n), \theta_k(\varphi n)]_k, S_n(\varphi n), \sigma_k(\varphi n)\}$ |

Parallel Angle, $\phi_h$, where $h = 0, \ldots, n$.
Set $P_p = \left\{\left[\rho_{S_{h_g}}(\varphi_h), \theta_i(\varphi_h)\right], S_{h_g}(\varphi_h), \sigma_i(\varphi_h) \mid e = 0, \ldots, k; i = 0, \ldots, k; h = 0, \ldots, n\right\}$,
where $p = 0, \ldots, n$.

From Table 1, the mapping is vector-valued. Notice that the J-Table contains two additional entries for each row, the distance between points in the hypothesis, $S_h$, and the direction angle, $\sigma_i$.

For detection, if the parallel angle, $\phi_{ij}$, formed by the line passing between points i and j (where $\psi_i = \psi_j$) is equal to the parallel angle of the $h^{th}$ row of the J-Table, $\phi_h$, then these two-points may belong to the $h^{th}$ row of the table. Consequently, each reference point of the two-reference point concept can be calculated as follows: Let $(x_R, y_R)$ designate the location of the reference point in the image, $[\rho_{S_R}, \theta_i]$ is the vector with parallel angle, $\phi_h$, and the mid-point is $(x_m, y_m)$ between i and j with point distance in the image, $S_t$, hence, the reference point equations from the GHT now become:

$$x_R = x_m + [(\rho_{S_h}(\phi_h) S_t) \cos(\theta_i(\phi_h) + \delta)] \quad (12)$$

$$y_R = y_m + [(\rho_{S_h}(\phi_h) S_t) \sin(\theta_i(\phi_h) + \delta)]. \quad (13)$$

To symbolize the pose-invariance above, let the radial vector now be denoted as $P_P^\phi$, such that $$P_P^\phi = [\rho_{S_h} \times S_t, \theta_P]$$

where $$\rho_{S_h} = \frac{\rho_i}{S_h} \quad (14)$$

$$\theta_P = \theta_i + \delta. \quad (15)$$

Once the two-reference points are selected, the J-Table is formed with respect to these two points. The J-Table now contains the data aiding in the pose-invariance of the PIHT procedure which may be executed as follows as reflected in steps 35, 37, 39, and 41 of FIG. 8A.

---

1. Initialize Hough parameter space accumulator, A[][] = 0.
2. For gradient angles, $\psi$, from 0° to 179°:
    a. For each pair of edge points with the same gradient angle, $\psi_i$:
        i. $\phi_{if} = \psi_i - \sigma_{if}$ // Calculate $\phi_{if}$ between edge points.
        ii. For each row of the J-Table, h:
            1. If $\phi_{if} = \phi_h$:
                a. (Use Equations 11 through 13 in sequence.)
                b. A[$x_R$][$y_R$] = A[$x_R$][$y_R$] + 1.
3. Any two relative peaks in the accumulator array satisfying Equations 16 and 17, below, indicates the position of the desired object.

---

Global maxima in the accumulator array indicate the translation of the two-reference points; however, the rotation and scale of the object remain unknown. To find rotation simply use the following equation with the two candidate reference points, denoted $(X_1, Y_1)$ and $(X_2, Y_2)$:

$$\theta = \tan^{-1}\left(\frac{Y_2 - Y_1}{X_2 - X_1}\right) \quad (16)$$

Scale is obtained by also using previously defined formulas merged together to provide a scale ratio, $$\frac{S}{S_R} = \frac{\sqrt{(X_2 - X_1)^2 + (Y_2 - Y_1)^2}}{\sqrt{(x_{R_2} - x_{R_1})^2 + (y_{R_2} - y_{R_1})^2}}. \quad (17)$$

Therefore, a rotation- and scale- (i.e., pose-) invariant Hough Transform has been developed and presented in great detail. This new variant exploits the geometry that accompanies the idea of the two-reference and—image point concepts used. Furthermore, a new version of the R-Table, called the J-Table, was derived which contains pose-invariance of a hypothesized object and aids the execution of a procedure specifically designed for use with the table.

The two-reference points located by the PIHT, alone, meet the requirement for an indicator-of-match that the hypothesized object is actually in the image. However, this solely does not provide the requisite level-of-match. A supplemental operation using the recently found reference points can provide a delineation of the desired region based on these two reference points (i.e., explicit indicator-of-match).

Since the Hough Transform is just that, a transform, this implies that a reverse or inverse operation can be executed on it. Consequently, in this section the details on an *Inverse-Pose-Invariant Hough Transform* (*IPIHT*) are provided. The IPIHT uses the results from the PIHT and in conjunction with the hypothesis (i.e., J-Table) generates a delineation corresponding to the desired region, thus, providing a more explicit indicator-of-match. Additionally, another transform—known as the Distance Transform—is utilized to provide a quantitative level-of-match between the extracted region and the actual region in the image.

Figure 5:
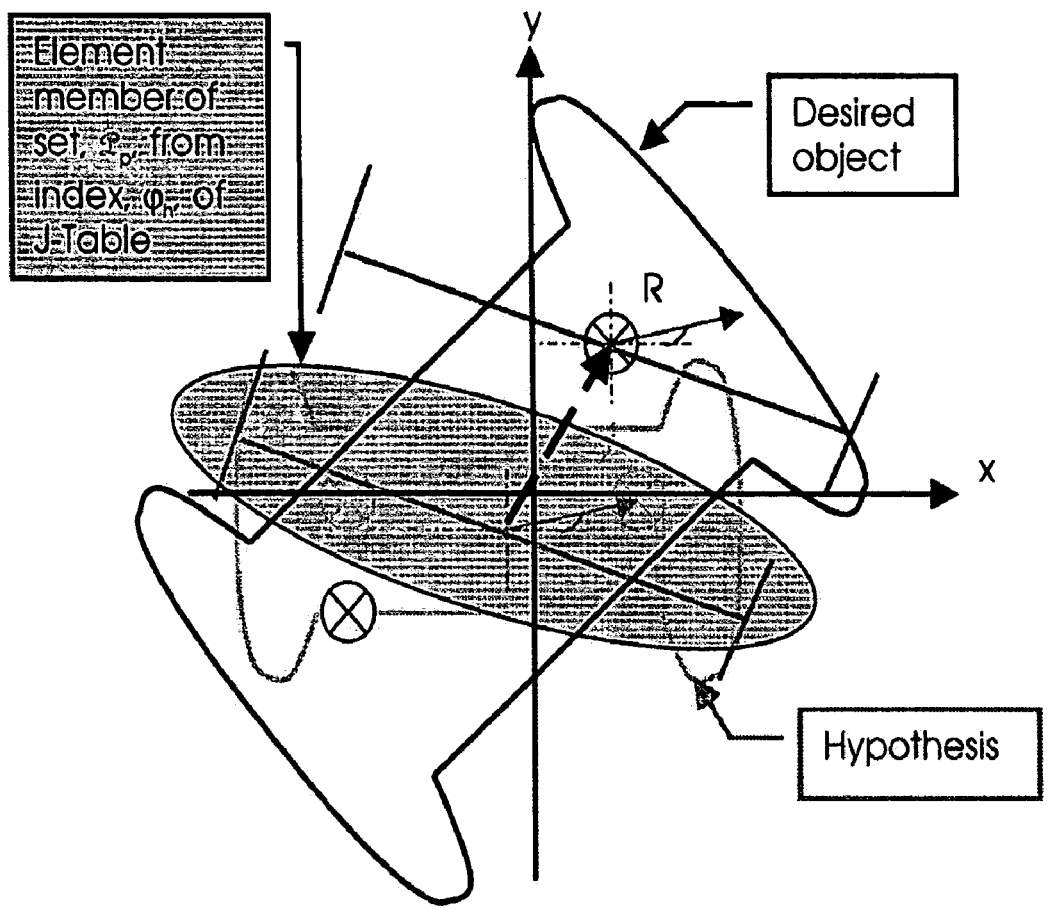
FIG. 5 is a diagram of the geometry of the Inverse-Pose-Invariant Hough Transform applied to the image of FIG. 3.

FIG. 5 depicts the geometry involved and initial calculations performed by the IPIHT algorithm.

For each row entry member of the J-Table, the IPIHT effectively superimposes the elements of the set, $\mathcal{L}_p$, onto a reference point, as shown in FIG. 4. Once an element of the set, $\mathcal{L}_p$, is virtually superimposed onto a reference point, R, the first set of calculations obtains the mid-point, $(X_m, Y_m)$, of the desired boundary point pair, $(X_i, Y_i)$ and $(X_j, Y_j)$. To achieve this note that the radial distance, $\rho_{S_h}$, and radial angle, $\theta_i$, of the radial vector, $P_p$, are manipulated. Since $\rho_{S_h}$ is normalized by $S_h$ and the recognized object maybe at a larger or smaller scale than the hypothesis, to obtain the correct location for $(X_m, Y_m)$ requires the following calculation of $\rho_\mu$ (at the index, $\phi_h$, of the J-Table);

$$\rho_\mu(\varphi_h) = (\rho_{S_h}(\varphi_h) \times s_h(\varphi_h))\left(\frac{S}{S_R}\right). \quad (18)$$

Also consider that the recognized object may be at a rotation greater than or equal to the 0° rotation of the hypothesis. Thus, the radial angle portion, $\theta_1$, of $P_p$ must be rotated by the rotation angle, $\theta_R$. This new angle must then be rotated an additional 180° to direct $\rho_\mu$, to the mid-point, $(X_m, Y_m)$, for boundary point pairs, $(X_i, Y_i)$ and $(X_j, Y_j)$. Consequently, $$\theta_\mu(\phi_h) = \theta_{i(\phi h)} + \theta_R + \pi. \quad (19)$$

With Equations 18 and 19, the calculation of the mid-point, $(X_m, Y_m)$, associated with elements of the set, $\mathcal{L}_p$, from row $\phi_h$ of the J-Table, is obtained by:

$$X_m = X_n + [\rho_\mu(\phi_h) \cos(\theta_\mu(\phi_h))]; \text{ for } n=1 \text{ and } 2 \quad (20)$$

$$Y_m = Y_n + [\rho_\mu(\phi_h) \sin(\theta_\mu(\phi_h))]; \text{ for } n=1 \text{ and } 2 \quad (21)$$

Now that the mid-point, $(X_m, Y_m)$, has been obtained using the $S_h$ element of $L_p$ and the scale ratio, $$\frac{S}{SR},$$

the boundary point pair, $(X_i, Y_i)$ and $(X_j, Y_j)$, associated with $(X_m, Y_m)$ can be acquired.

Given $(X_m, Y_m)$, acquiring $(X_i, Y_i)$ is a matter of utilizing not only $S_h$ and $$\frac{S}{SR},$$

but also the rotation angle, $\theta_R$. Once again, since the recognized object maybe at a larger or smaller scale than the hypothesis, each $S_h$ value must be scaled to the proper size for the desired object. However, the results of Equations 20 and 21 have effectively situated the current state of calculations at the center of this distance. Accordingly, only half the distance is needed to find $(X_i, Y_i)$ and $(X_j, Y_j)$ from the coupled mid-point, $(X_m, Y_m)$, hence, $$S_B(\varphi_h) = \frac{1}{2} Sh(\varphi_h) \left( \frac{S}{SR} \right) \quad (22)$$

Since a positive angle of rotation is always assumed, all boundary points on the desired object are rotated by $\theta_R$, with respect to their corresponding boundary points in the hypothesis. Furthermore, all boundary point pairs are matching gradient angles, and thus, are always 180° apart from each other. Nonetheless, recall from Section II-A that these boundary point pairs are rotated by $\sigma_h$. Therefore, to obtain the correct angles that will point $S_B$ to boundary point pairs, $(X_i, Y_i)$ and $(X_j, Y_j)$, from an associated mid-point, $(X_m, Y_m)$, requires the following consideration:

$$\theta_B(\phi_h) = \sigma_i(\phi_h) + \theta_R \quad (23)$$

where $\sigma_i(\phi_h)$ is the direction angle element extracted from the J-Table, of the set, $\mathcal{L}_p$, at row $\phi_h$ To aim to the opposing boundary point requires a 180° rotation, $$\theta_{B_\tau}(\phi_h) = \sigma_i(\phi_h) + \theta_R + \pi. \quad (24)$$

As a result, the boundary point pairs are established by the following formulas:

$$X_j = X_m + [S_B(\phi_h) \cos(\theta_B(\phi_h))] \quad (25)$$

$$Y_j = Y_m + [S_B(\phi_h) \sin(\theta_B(\phi_h))] \quad (26)$$

$$X_i = X_m + [S_B(\phi_h) \cos(\theta_{B_\tau}(\phi_h))] \quad (27)$$

$$Y_i = Y_m + [S_B(\phi_h) \sin(\theta_{B_\tau}(\phi_h))]. \quad (28)$$

Figure 8A:
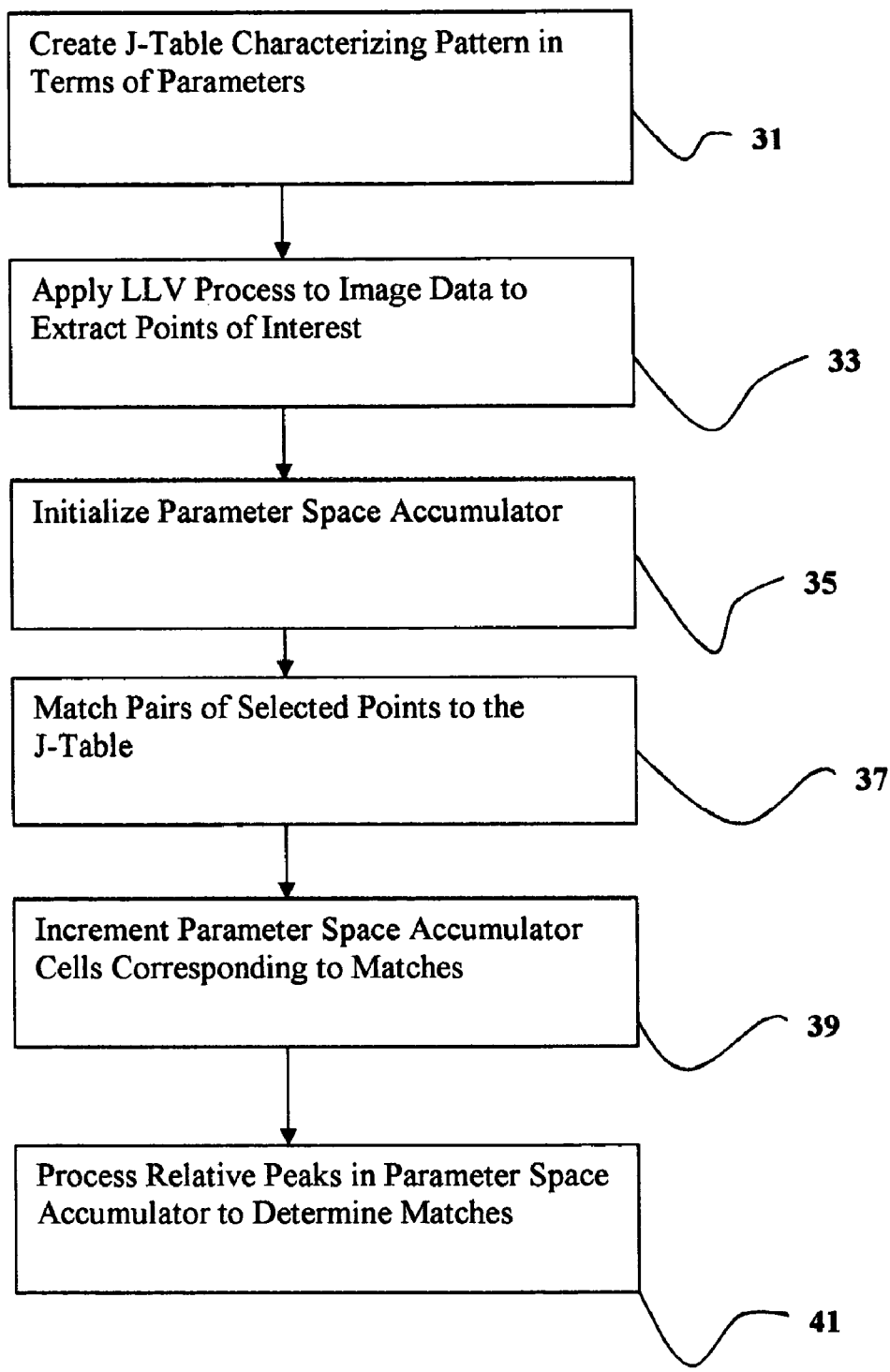
FIG. 8A is a flow chart of the Pose-Invariant Hough Transform of the present invention.
Figure 8B:
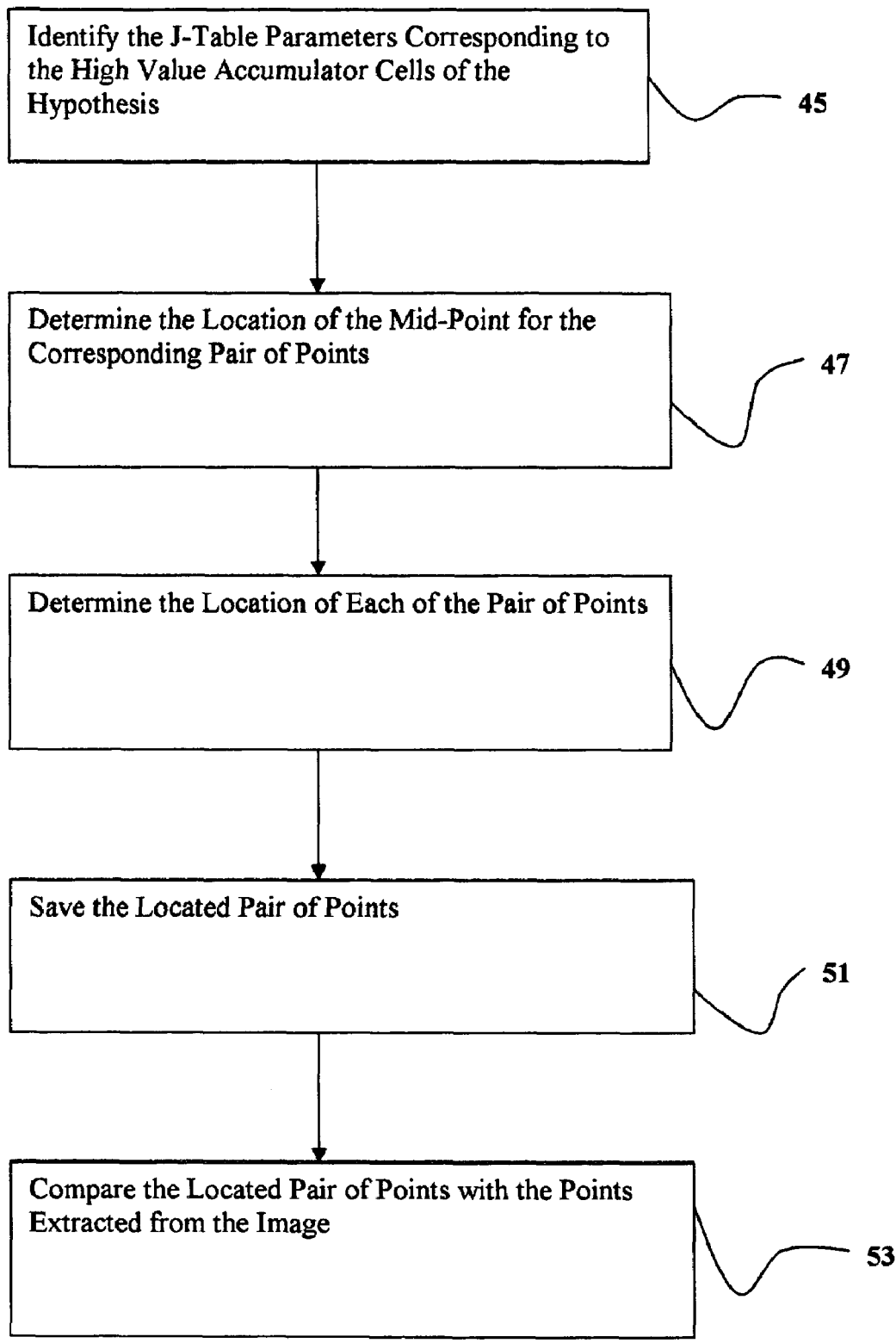
FIG. 8B is a flow chart of the Inverse-Pose-Invariant Hough Transform of the present invention.

Using the same J-Table and Equations 18 through 28, the IPIHT algorithm is executed as follows and reflected in steps 45, 47, 49, 51 and 53 of FIG. 8B.

1. Obtain the J-Table (i.e., hypothesis) representation of the object from the PIHT (Table 1.)
2. For each reference point, n, where n = 1, 2:
   a. For each row of the J-Table, h, where $\phi_h$ is an index:
      // First, find mid-point, $(X_m, Y_m)$.
      i. (Use Equations 18 through 21 in sequence.)
      // Next, find boundary point pair, $(X_j, Y_j)$.
      ii. (Use Equations 22, 23, 25, and 26 in sequence.)
      // Now, find boundary point pair, $(X_i, Y_i)$.
      iii. (Use Equations 24, 27, and 28 in sequence.)
      iv. Save locations, $(X_i, Y_i)$ and $(X_j, Y_j)$, into the set of located boundary points, $\mathfrak{J}$, where
         $\mathfrak{J} = \{(X_k, Y_k) \mid k = 0, \ldots, n\}$ where n is the total number of boundary points stored in the J-Table.
      v. Visually identify locations, $(X_i, Y_i)$ and $(X_j, Y_j)$, in the image as boundary points of the desired object.
3. The resulting delineation provides an explicit indicator-of-match between the extracted object and the actual object in the image.

Distance Transform

A natural quantitative measure of match between an extracted region and the actual desired region is a metric equal to zero for a perfect match that gets larger as the boundaries become further apart in terms of Euclidean distance.

In order to evaluate the similarity between an extracted region and the desired region in an image a correspondence between points on both curves is needed. Due to discrete values in digital images and noise that may exist at edge pixels, it is unnecessary to waste time and computational effort computing exact Euclidean Distances. An appropriate measure that overcomes these problems is the Distance Transform, also known as Chamfer Matching.

The Distance Transform (DT) essentially alters an edge image, consisting of object-edge and background pixels, into a gray-level image which denotes the distance each background pixel has to the nearest object-edge pixel. The new image produced by the DT is called a distance image. The DT can be computed by the use of several masks, a mask allows for a 2D transformation to occur; the most common is a 3×3 mask which obtains the Chamfer-¾ distance.

To obtain the actual Matching Metric (i.e., level-of-match), M, a correspondence is needed between the extracted region and the distance image, D. The DT has been shown exceedingly appropriate when used with a Matching Metric to correspond edge images. Recall that the PIHT/IPIHT framework ultimately provides a set of located boundary points, $\mathfrak{J}$ Hence, the Matching Metric, M, is computed by projecting each xy-coordinate pair from set $\mathfrak{J}$ onto the corresponding (x, y) location of the distance image, D. By transversing the projection of the coordinate pairs, $(X_k, Y_k)$, an average cumulative sum of the distance value at each (x, y) location in D is obtained. The average cumulative sum is the thus defined as the Matching Metric, M. Consequently, a perfect fit between the set $\mathfrak{J}$ and the distance image, D, is a Matching Metric result of zero.

The Root Mean Square (RMS) Average obtains drastically fewer false minima than other functions that might be used as Matching Metrics. The RMS Average is defined as follows:

$$M(\Im, D) = \frac{1}{3}\sqrt{\frac{\sum_{k=0}^{n} d_k^2}{n}} \quad (29)$$

where $d_k$ are the distance values from the distance image, D, and n is the number of coordinate pairs, $(X_k, Y_k)$, from the set $\Im$.

Now, a complete procedure for implementing the ILV process can be presented. This procedure includes the PIHT/IPIHT framework for finding reference points and delineating regions, the creation of a distance image from a DT, and subsequently, the calculation of a Matching Metric between an extracted region and the actual desired region from an image.

Figure 8C:
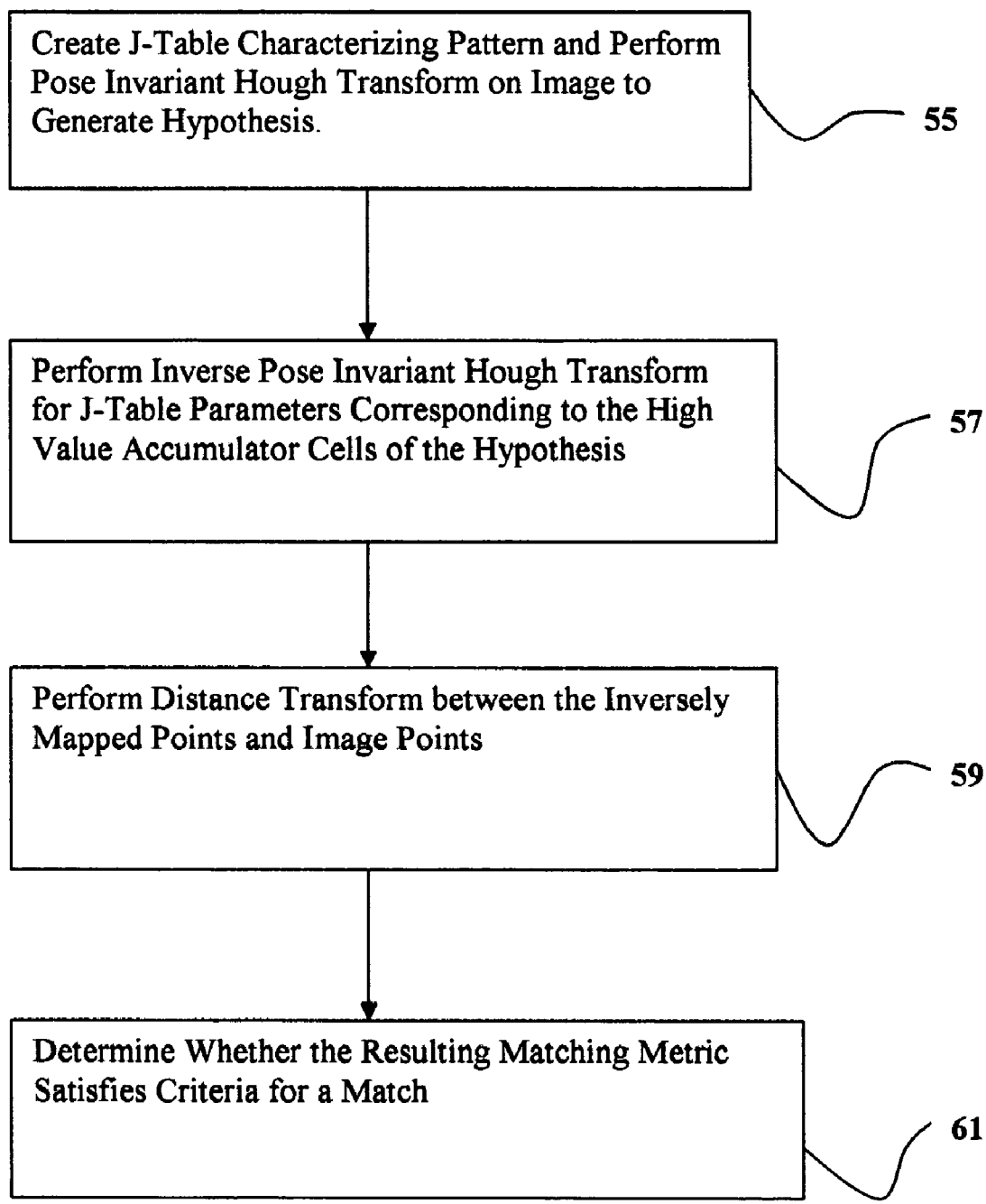
FIG. 8C is a flow chart of the present invention including the Distance Transform and Matching Metric steps.

PIHT/IPIHT Framework with DT and Matching Metric (ILV Process)
1. Execute PIHT algorithm as shown in FIG. 8A.
2. Execute IPIHT algorithm, as shown in FIG. 8B.
3. Execute DT algorithm as reflected in step 59 of FIG. 8C.
4. Execute Matching Metric, M
   A. For k=0 to n:
      (i) Get $(X_k, Y_k) \in \Im$
      (ii) Get $d_k$ at $(X_k, Y_k)$ from distance image, D.

$$M = \frac{1}{3}\sqrt{\frac{d_k^2}{n}} + M.$$

B. Result is M which quantitatively enumerates how close the extracted region from PIHT/IPIHT framework fits the actual desired region from the image as reflected in step 61 of FIG. 8C.

Therefore, starting with a high-level hypothesis and using the image data, the ILV process detailed above obtains the level- and indicator-of-match, all required and thus, meeting the goal of this work.

EXAMPLE—DUALTEST

The efficiency of the PIHT/IPIHT framework depends on several factors, including: Quality of segmentation, accuracy of gradient determination, and validity of Hough Transform capabilities. To determine if any or all of these factors affect performance of the framework the example described below and in FIG. 6 is provided:

This example presents an image which contains both the quadrilateral and arbitrary shape, along with other shapes within it. The purpose is to review the ILV implementation's capability of finding one shape, when other shapes are also present in the image. In other words, this can be regarded a synthetic-experimental-example of a real-world image.

Figures 6A, 6B:
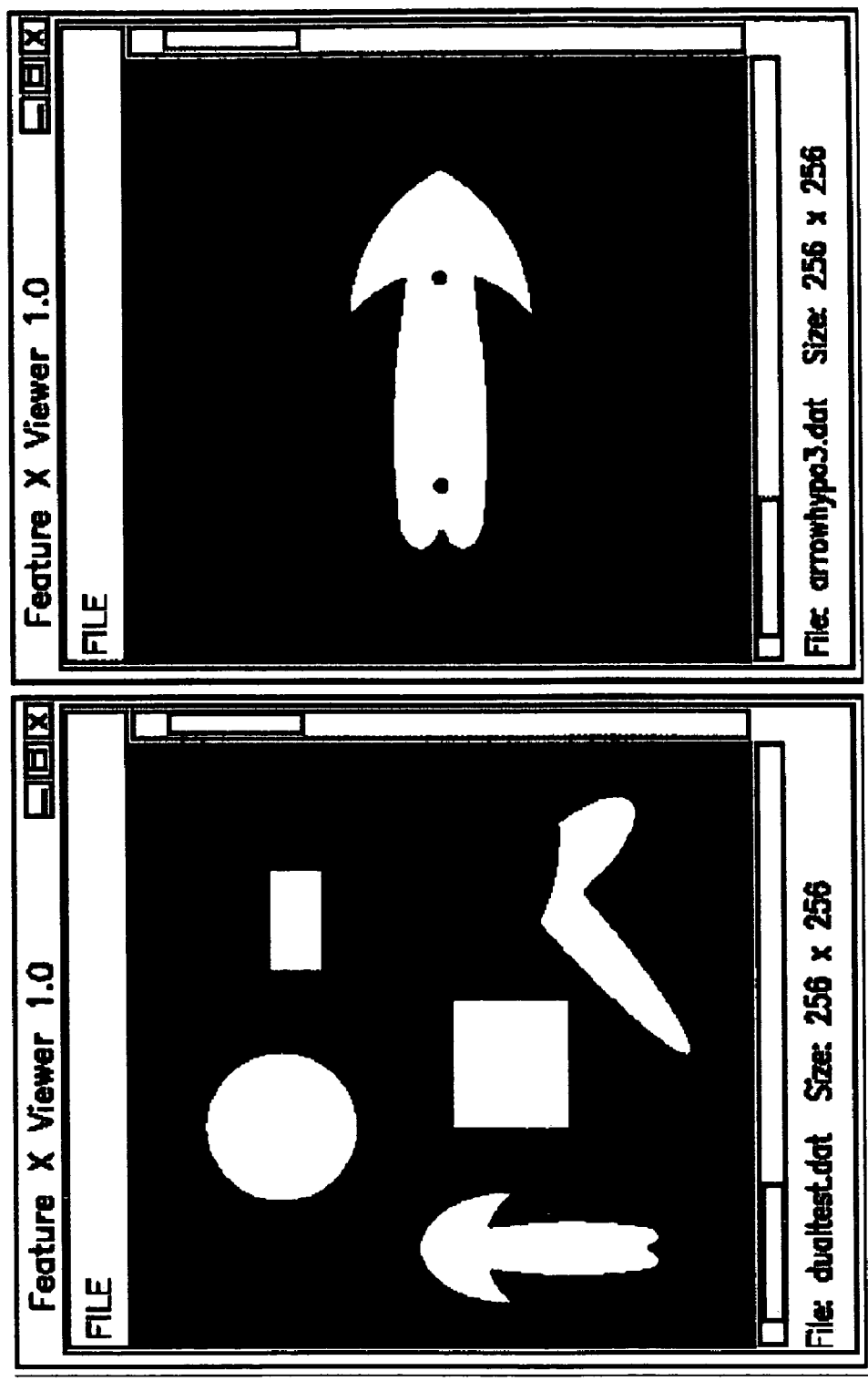
FIG. 6A illustrates a collection of images utilized in testing the invention with respect to an arbitrarily shaped object pattern.
FIG. 6B illustrates the hypothesis for the arbitrarily shaped object pattern.

FIG. 6A shows the DUALTEST image along with FIG. 6B illustrating the hypothesis for the arbitrary shape. Note that the desired object for extraction (i.e., arbitrary shape) is rotated and unscaled from its hypothesis.

Figure 7:
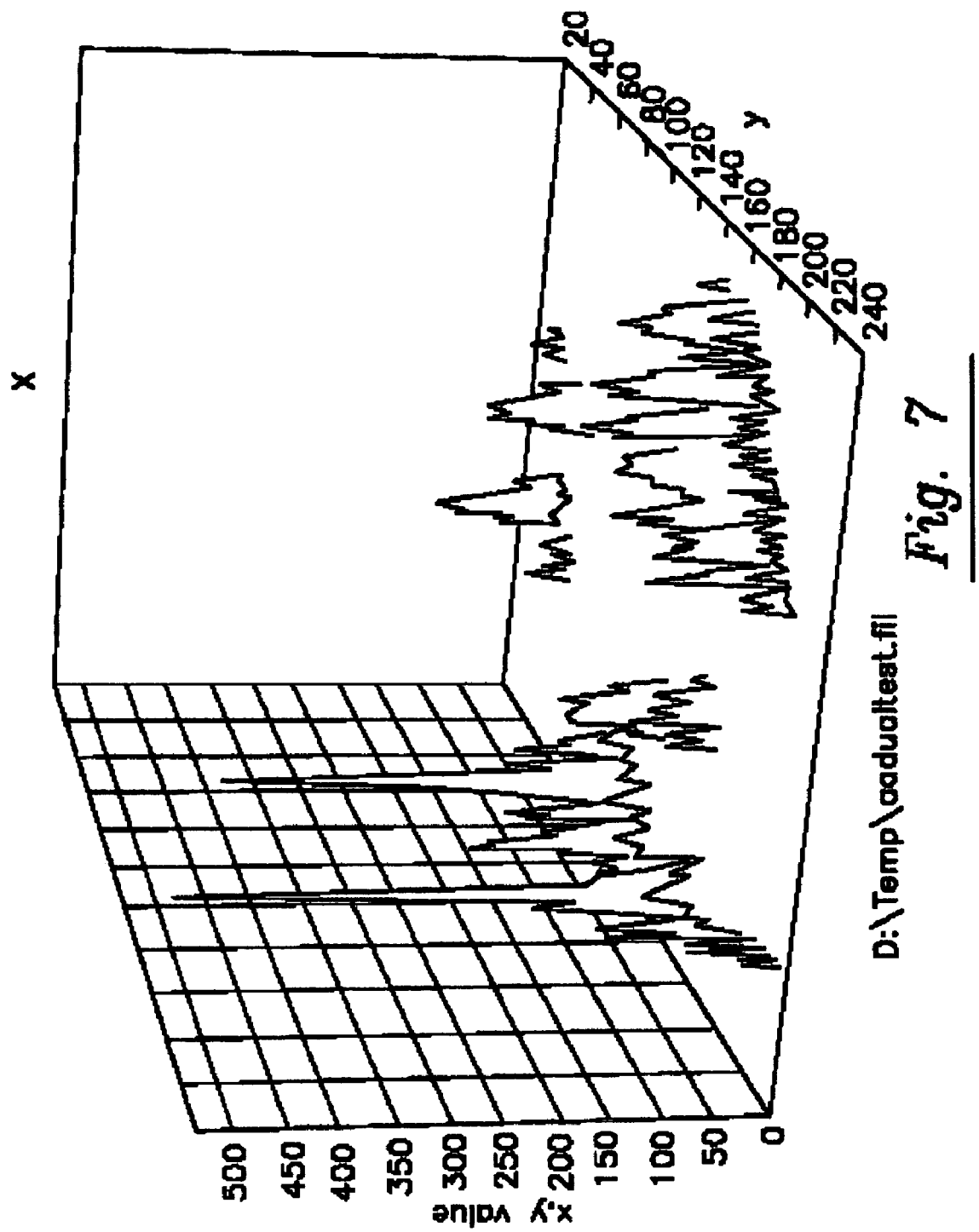
FIG. 7 illustrates a surface plot of the Hough parameter space for the arbitrarily shaped object pattern of FIG. 6.

A surface plot represents the Hough Parameter Space (HPS) graphically enhanced, this is shown in FIG. 7.

Notice that the quadrilateral shapes (i.e., rectangle and square) are not recognized, nonetheless, the other arbitrary and analytical shape did cause some false voting to occur. Clearly, this did not affect the PIHTs ability at indicating the existence of the desired arbitrary shape, by locating its resultant reference points.

In this case, a Matching Metric, M, was achieved at 1.158. The upper portions of the object were not quite outlined exactly, thus, causing the M value to increase farther from zero. Nevertheless, the desired region was extracted; M values of less than 4.0 still indicate acceptable recognition.

Analysis of Capabilities

In this section a tabular analysis of several experiments performed is presented. The tabulated data provides two measurements: Absolute M, and Percentage Error from Zero (PEZ). Absolute M, is simply the Matching Metric obtained for that particular test. PEZ is calculated based on the worst-case delineation of an extracted region. Recall M is calculated by summing all the coordinate pairs using Equation 29. If the worst-case delineation is assumed, this correlates to $d_k$'s projecting to the highest possible values (i.e., 255) in a distance image. Hence, Equation 29 now happens to be, in the worst-case:

$$\frac{1}{3}\sqrt{\frac{(255)^2 * n}{n}}.$$

Essentially, the worst-case M now becomes 85.0 for all n. Consequently, PEZ becomes:

$$PEZ = \left(\frac{\text{Absolute } M}{\text{Worst} - \text{Case } M}\right)100. \quad (30)$$

Larger PEZ values indicate how far from zero, or close to the worst-case possible, the absolute M was obtained. Clearly, PEZ values close to or at 0% are preferred.

In Table 2, the tabulated results for the simple experiments, both quadrilateral and arbitrary (neither exclusively circular nor quadrilateral), and Special Case are shown.

TABLE 2

Quadrilateral, Arbitrary, and Special Case Experiments Absolute and Percentage Error Results

|  |  | UR-US | R-US | UR-HS | UR-DS | R-HS | R-DS |
|---|---|---|---|---|---|---|---|
| QUAD | Absolute | 0.818 | 0.715 | 0.822 | 0.578 | 0.709 | 1.000 |
|  | PEZ (%) | 0.962 | 0.841 | 0.976 | 0.680 | 0.834 | 1.176 |
| ARB | Absolute | 0.750 | 1.082 | 1.056 | 0.950 | 0.882 | 1.021 |
|  | PEZ (%) | 0.882 | 1.273 | 1.242 | 1.118 | 1.038 | 1.201 |
| Special | Absolute | 0.871 | 1.447 | 0.929 | 1.261 | 1.076 | 1.582 |
| Case | PEZ (%) | 1.025 | 1.702 | 1.093 | 1.484 | 1.266 | 1.861 |

NOTE:
The legend for the table above and which subsequently follow is: QUAD, Quadrilateral object; ARB, Arbitrary object; UR-US, Unrotated and Unscaled; R-US, Rotated and Unscaled; UR-HS, Unrotated and Half-Scaled; UR-DS, Unrotated and Double-Scaled; R-HS, Rotated and Half-Scaled; R-DS, Rotated and Double-Scaled.

As expected, the quadrilateral results obtained low absolute values obviously corresponding to low PEZ percentages. The best test case achieved was the unrotated and double-scaled object, while the highest numbers came from the rotated and double-scaled experiment. Overall, with results obtaining error percentages less than or close to 1%, clearly indicates that each of these objects (however differently posed from the original hypothesis surmised) was recognized by the ILV implementation. For the Special Care test experiments, although most error percentages are definitely above 1% and two closely reaching 2% (R-US and R-DS) this still remains a very good indication of object recognition. Recall that the Special Case test used a hypothesis that was not necessarily exact in shape to the object desired for extraction. Even so, there was no anomalous (i.e., wildly high absolute and PEZ value) test case documented. Thus, this situation proves the ILV implementation's capability of recognizing objects even when hypotheses are not identical to the desired object.

Table 3 provides the data on the DUALTEST image, both results on recognizing the quadrilateral and arbitrary object. Once again, error percentages are obtained less than or close to 1%.

TABLE 3

DUALTEST Experiments Absolute and Percentage Error Results

|  |  | DUALTEST |
|---|---|---|
| QUAD | Absolute | 0.822 |
|  | PEZ (%) | 0.967 |
| ARB | Absolute | 1.158 |
|  | PEZ (%) | 1.362 |

This indicates the PIHT algorithm and associated framework is capable of recognizing a specific object in an image, even when there are other shapes present. This innovation can be used by companies providing remote sensing data and capabilities to identify areas or locations on the Earth's surface. The innovation provides a straightforward methodology of using a single template of the desired object for recognition, the object can be located, regardless of its scale, rotation, or translation difference in the image.

Although preferred embodiments of the present invention have been disclosed in detail herein, it will be understood that various substitutions and modifications may be made to the disclosed embodiment described herein without departing from the scope and spirit of the present invention as recited in the appended claims.

I claim:

1. A method of recognizing a pattern in an image comprising the steps of:
   (a) receiving data characterizing the pattern in pattern coordinate space;
   (b) selecting feature points for the pattern;
   (d) transforming the pattern from pattern coordinate space to a parameter space by creating a parameter table characterizing the pattern wherein pairs of feature points of the pattern are parameterized as a set of vectors with respect to at least two reference points;
   (e) receiving data representing the image;
   (f) extracting points of interest from the image data utilizing a low level vision process;
   (g) initializing a parameter space accumulator comprising an array of cells;
   (h) selecting pairs of extracted points parallel to each other in respect of their gradient angle and parameterizing the pairs of extracted points;
   (i) comparing the values computed for pairs of extracted points with the parameter table and incrementing the cells of the parameter space accumulator corresponding to matching parameter values; and
   (j) processing relative peaks in the accumulator array to determine a match with the desired template object.

2. The method of claim 1 wherein a distance between the pairs of feature points is calculated and is a parameter included in the parameter table.

3. The method of claim 1 wherein the pairs of feature points are parallel to each other in terms of their gradient angle.

4. The method of claim 1 wherein the parameter table characterizing the pattern is invariant to rotation, scale and translation.

5. The method of claim 3 wherein a parallel gradient identifier angle is computed for a pair of feature points as follows:
   a line connecting the pair of feature points has a direction angle $\sigma$,
   the gradient angle at each of the feature points is assigned the value $\psi$, and
   the parallel gradient identifier angle $\phi$ is computed by subtracting the direction angle from the gradient angle so that $\phi = \psi - \sigma$.

6. The method of claim 5 wherein scale-invariance is included in the parameter table by normalizing the radial distance portion of the vector connecting a midpoint of the line between the pair of feature points to one of the at least two reference points, and including the normalized radial distance in the parameter table.

7. The method of claim 5 wherein the distance between the pair of feature points is computed and included in the parameter table.

8. The method of claim 5 wherein the direction angle $\sigma$ between the pair of feature points is a parameter included in the parameter table.

9. The method of claim 5 wherein the parallel gradient identifier angle $\phi$ of the pair of feature points serves as an index for the parameter table.

10. The method of claim 1 wherein a match determined with the pattern is processed as a hypothesized match, and the parameter table entries corresponding to the relative peaks in the accumulator array for the hypothesized match are inversely transformed from parameter space to depict test points in pattern space.

11. The method of claim 10 wherein the test points are superimposed upon the image.

12. The method of claim 11 wherein a distance transform is applied to determine a level-of-match between the test points and points of interest in the image.

13. The method of claim 12 wherein a matching metric is computed to quantitatively enumerate a level of match between the test points inversely transformed and the hypothesized pattern in the image.

14. The method of claim 13 wherein the root mean square average is computed to quantitatively enumerate the level of match.

15. The method of claim 1 wherein the pattern has an arbitrary shape.

16. The method of claim 1 wherein the parameter table is the only stored representation of the pattern in parameter space utilized in the comparison to the values computed for pairs of extracted points.

17. The method of claim 1 wherein a parallel gradient identifier angle is computed for a pair of extracted points as follows:
   a line connecting the pair of extracted points has a direction angle $\sigma$,
   the gradient angle at each of the extracted points is assigned the value $\psi$, and the parallel gradient identifier angle $\phi$ is computed by subtracting the direction angle from the gradient angle so that $\phi=\psi-\sigma$.

18. The method of claim 9 wherein a parallel gradient identifier angle is computed for a pair of extracted points and is used to look up parameters corresponding to said parallel gradient identifier angle in the parameter table.

* * * * *